(12) United States Patent
Smallwood (10) Patent No.: US 6,931,125 B2
(45) Date of Patent: Aug. 16, 2005

(54) TELEPHONE EQUIPMENT COMPATIBLE, TWELVE BUTTON ALPHANUMERIC KEYPAD

(76) Inventor: Gregory N. Smallwood, 19200 Space Center, #1630, Houston, TX (US) 77058

( * ) Notice: Subject to any disclaimer, the term of this patent is extended or adjusted under 35 U.S.C. 154(b) by 375 days.

(21) Appl. No.: 09/901,763

(22) Filed: Jul. 10, 2001

(65) Prior Publication Data

US 2003/0012368 A1 Jan. 16, 2003

(51) Int. Cl.[7] .................................................. H04M 1/00
(52) U.S. Cl. ..................................... 379/433.07; 379/368
(58) Field of Search ............................. 379/433.07, 368; 200/5 A (56) References Cited

U.S. PATENT DOCUMENTS

| | | | |
|---|---|---|---|
| 3,967,273 A | | 6/1976 | Knowlton |
| 5,528,235 A | * | 6/1996 | Lin et al. ..................... 379/368 |
| 5,877,709 A | | 3/1999 | Ala-Lehtimaki |
| 5,900,829 A | | 5/1999 | Gardner et al. |
| 6,043,761 A | | 3/2000 | Burrell |
| 6,130,628 A | | 10/2000 | Schneider-Hufschmidt et al. |
| 6,377,685 B1 | * | 4/2002 | Krishnan ..................... 379/368 |

* cited by examiner

Primary Examiner—Jack Chiang
(74) Attorney, Agent, or Firm—Sherman D. Pernia (57) ABSTRACT

A keypad for entering a complete set of alphanumeric characters (including symbols) into telephonic equipment comprises a housing containing a telephone set compatible array of manually operated actuator elements, each actuator element selectably coding for four or more alphanumeric characters upon a single actuation of the element. The manually operated actuator elements each comprises a push button assembly and a switch assembly. The switch assembly further comprises two or three switches. In a two-way switch assembly, the push button assembly is manually operable to selectably close either switch individually and both switches together. In a three-way switch, the push button assembly is manually operable to selectably close any one of the three switches individually. The push button assembly includes a push button cover that has an upper surface that serves as a user interface, which is configured to facilitate a user's operation of the actuator elements (keys) to selectively enter discrete alphanumeric selections into the keypad.

8 Claims, 12 Drawing Sheets

| Button | Mode of operation | SHIFT Position | DISPLAY | | |
|---|---|---|---|---|---|
| | | | Action A | Action B | Action C |
| 1 | NUMERIC/SHIFT OFF | | 1 | 1 | 1 |
| 2 | NUMERIC/SHIFT OFF | | 2 | 2 | 2 |
| 3 | NUMERIC SHIFT OFF | | 3 | 3 | 3 |
| 4 | NUMERIC/SHIFT OFF | | 4 | 4 | 4 |
| 5 | NUMERIC/SHIFT OFF | | 5 | 5 | 5 |
| 6 | NUMERIC/SHIFT OFF | | 6 | 6 | 6 |
| 7 | NUMERIC/SHIFT OFF | | 7 | 7 | 7 |
| 8 | NUMERIC/SHIFT OFF | | 8 | 8 | 8 |
| 9 | NUMERIC/SHIFT OFF | | 9 | 9 | 9 |
| * | NUMERIC/SHIFT OFF | | * | * | SHIFT ON |
| 0 | NUMERIC/SHIFT OFF | | 0 | 0 | 0 |
| # | NUMERIC/SHIFT OFF | | # | # | # |
| 1 | ALPHA/SHIFT ON | SHIFT | + | - | / |
| 2 | ALPHA/SHIFT ON | SHIFT | A | B | C |
| 3 | ALPHA/SHIFT ON | SHIFT | D | E | F |
| 4 | ALPHA/SHIFT ON | SHIFT | G | H | I |
| 5 | ALPHA/SHIFT ON | SHIFT | J | K | L |
| 6 | ALPHA/SHIFT ON | SHIFT | M | N | O |
| 7 | ALPHA/SHIFT ON | SHIFT | P | R | S |
| 8 | ALPHA/SHIFT ON | SHIFT | T | U | V |
| 9 | ALPHA/SHIFT ON | SHIFT | W | X | Y |
| * | ALPHA/SHIFT ON | SHIFT | Q | * | SHIFT OFF |
| 0 | ALPHA/SHIFT ON | SHIFT | \ | @ | SPACE |
| # | ALPHA/SHIFT ON | SHIFT | Z | # | • |

*Fig. 6A*

|  |  |  | DISPLAY | | |
| --- | --- | --- | --- | --- | --- |
| Button | Mode of operation | SHIFT Position | Action A | Action B | Action C |
| 1 | NUMERIC/SHIFT OFF |  | 1 | 1 | 1 |
| 2 | NUMERIC/SHIFT OFF |  | 2 | 2 | 2 |
| 3 | NUMERIC SHIFT OFF |  | 3 | 3 | 3 |
| 4 | NUMERIC/SHIFT OFF |  | 4 | 4 | 4 |
| 5 | NUMERIC/SHIFT OFF |  | 5 | 5 | 5 |
| 6 | NUMERIC/SHIFT OFF |  | 6 | 6 | 6 |
| 7 | NUMERIC/SHIFT OFF |  | 7 | 7 | 7 |
| 8 | NUMERIC/SHIFT OFF |  | 8 | 8 | 8 |
| 9 | NUMERIC/SHIFT OFF |  | 9 | 9 | 9 |
| * | NUMERIC/SHIFT OFF |  | * | * | * |
| 0 | NUMERIC/SHIFT OFF |  | 0 | 0 | 0 |
| # | NUMERIC/SHIFT OFF |  | # | # | # |
| 1 | ALPHA/SHIFT ON | SHIFT | + | - | / |
| 2 | ALPHA/SHIFT ON | SHIFT | A | B | C |
| 3 | ALPHA/SHIFT ON | SHIFT | D | E | F |
| 4 | ALPHA/SHIFT ON | SHIFT | G | H | I |
| 5 | ALPHA/SHIFT ON | SHIFT | J | K | L |
| 6 | ALPHA/SHIFT ON | SHIFT | M | N | O |
| 7 | ALPHA/SHIFT ON | SHIFT | P | R | S |
| 8 | ALPHA/SHIFT ON | SHIFT | T | U | V |
| 9 | ALPHA/SHIFT ON | SHIFT | W | X | Y |
| * | ALPHA/SHIFT ON | SHIFT | Q | ( | * |
| 0 | ALPHA/SHIFT ON | SHIFT | \ | @ | SPACE |
| # | ALPHA/SHIFT ON | SHIFT | Z | ) | # |

*Fig. 6B*

| KEY PRESSED | | INPUT RECEIVED | |
|---|---|---|---|
| | | COLUMN | ROW |
| 1 | LEFT | 1 | 1 |
| | RIGHT | 2 | 1 |
| 2 | LEFT | 3 | 1 |
| | RIGHT | 4 | 1 |
| 3 | LEFT | 5 | 1 |
| | RIGHT | 6 | 1 |
| 4 | LEFT | 1 | 2 |
| | RIGHT | 2 | 2 |
| 5 | LEFT | 3 | 2 |
| | RIGHT | 4 | 2 |
| 6 | LEFT | 5 | 2 |
| | RIGHT | 6 | 2 |
| 7 | LEFT | 1 | 3 |
| | RIGHT | 2 | 3 |
| 8 | LEFT | 3 | 3 |
| | RIGHT | 4 | 3 |
| 9 | LEFT | 5 | 3 |
| | RIGHT | 6 | 3 |
| * | LEFT | 1 | 4 |
| | RIGHT | 2 | 4 |
| 0 | LEFT | 3 | 4 |
| | RIGHT | 4 | 4 |
| # | LEFT | 5 | 4 |
| | RIGHT | 6 | 4 |

*Fig. 7*

| KEY PRESSED | | INPUT RECEIVED | |
|---|---|---|---|
| | | COLUMN | ROW |
| 1 | LEFT | 1 | 1 |
| | CENTER | 2 | 1 |
| | RIGHT | 3 | 1 |
| 2 | LEFT | 4 | 1 |
| | CENTER | 5 | 1 |
| | RIGHT | 6 | 1 |
| 3 | LEFT | 7 | 1 |
| | CENTER | 8 | 1 |
| | RIGHT | 9 | 1 |
| 4 | LEFT | 1 | 2 |
| | CENTER | 2 | 2 |
| | RIGHT | 3 | 2 |
| 5 | LEFT | 4 | 2 |
| | CENTER | 5 | 2 |
| | RIGHT | 6 | 2 |
| 6 | LEFT | 7 | 2 |
| | CENTER | 8 | 2 |
| | RIGHT | 9 | 2 |
| 7 | LEFT | 1 | 3 |
| | CENTER | 2 | 3 |
| | RIGHT | 3 | 3 |
| 8 | LEFT | 4 | 3 |
| | CENTER | 5 | 3 |
| | RIGHT | 6 | 3 |
| 9 | LEFT | 7 | 3 |
| | CENTER | 8 | 3 |
| | RIGHT | 9 | 3 |
| * | LEFT | 1 | 4 |
| | CENTER | 2 | 4 |
| | RIGHT | 3 | 4 |
| 0 | LEFT | 4 | 4 |
| | CENTER | 5 | 4 |
| | RIGHT | 6 | 4 |
| # | LEFT | 7 | 4 |
| | CENTER | 8 | 4 |
| | RIGHT | 9 | 4 |

TELEPHONE EQUIPMENT COMPATIBLE, TWELVE BUTTON ALPHANUMERIC KEYPAD

FIELD OF THE INVENTION

The present invention is in the field of telephonic communications equipment for the generation of coded data. More specifically, the present invention relates to an array of manually actuated control elements, each of which is indicative of an individual code value (i.e., character or digit).

BACKGROUND OF THE INVENTION

The typical telephone equipment compatible keypad, such as is used on a plain old telephone set (POTS), is an array of twelve manually actuated control elements arranged in four rows of three control elements each. These telephonic type keypads typically code for the numbers 0 through 9 and the symbols "*" and "#". These keypads do not separately code for alphabetical characters. Although the keypads may be marked with alphabetical characters, for example, the "2" key also corresponds to the letters "A", "B", and "C." Therefore, on the typical telephonic keypad, a single key does not code for a separate alphabetical character (alpha-character).

However, as the use of personal electronic devices and software applications continues to increase, many of these applications require a user to enter alpha-character information to accomplish their full utility. Many personal electronic devices, such as cellular telephones, are limited in the amount of surface area on which to mount a keypad. Therefore, the field has been motivated to provide devices or methods adapting the typical telephonic keypad to additionally code for separate alpha-characters.

In one method of using the typical telephonic keypad to code for alpha-characters, the user presses the key associated with the desired character. Since each key represents several characters, the application must determine which of these characters is intended by the user. This is often accomplished by allowing the user to iterate though the possible characters by pressing the corresponding key multiple times. For example, to enter the number "2" the key "2" is pressed once. However, to enter the letter "C", the user would press the "2" key three additional times with a time period immediately following pressing the key "2" the first time. To enter the letter "B," the user would press the "2" key an additional two times.

In another approach, a special key (e.g., the "*" key) is pressed first to shift the keypad into alpha-character mode, and then the numeric key corresponding to the desired alpha-character is repeatedly pressed a number of times corresponding to place in the sequence the desired alpha-character is listed on the numeric key. For example, if the desired alpha-character is "B," then the "*" key is pressed and the "2" key is pressed twice. See Schneider-Hufschmidt et al., U.S. Pat. No. 6,130,628. In some applications, each time the numeric key is pressed in the alpha-character mode, the corresponding letter may be presented to the user (e.g., via data display). Burrell, U.S. Pat. No. 6,043,761, discloses an approach similar to Schneider-Hufschmidt et al. for using a twelve button numeric keypad to generate alpha-characters.

Typically in these approaches, after the keypad is in alpha mode, the iteration through characters starts with the first character of the series for that numeric key. For example, when using the "2" key in alpha mode, iteration starts at "A." Accordingly, for at least two-thirds of the characters entered on the keypad, multiple key presses are required. Knowlton, U.S. Pat. No. 3,967,273, early on described a method that can be adapted to require only two button pushes on twelve button telephonic keypad to select an input from a large set of alphanumeric characters. However, the Knowlton device does not teach a typically telephonic configured keypad labeling system, and required at least two button pushes to enter an alpha-character. Still, using any of these techniques to enter entire words and sentences is tedious and error-prone, and results in a user's limited use of applications requiring text entry on devices using numeric keypads (e.g., telephones). It is also slow and typically requires frequent checks of the visual display, if available, to assure accuracy. Also, PDA's can have a keypad and a (LCD) keyboard, which requires a stylus or a mouse to enter alpha characters.

In an example of a prior technology alphanumeric coding for the letter sequence "abc," once in the alpha-character mode, the "2" button is pressed three times, the # button once, the "2" button is pressed once, the # button once and then the "2" button is pressed twice, for a total of 8 actions. It is an object of the present keypad, that once a character set is selected via a mode or shift key, only three press operations are required to code for the same sequence of letters. Entering spaces required pressing the # button twice on some prior keypads. An advantage of the present invention is that a space may be entered in a single press.

In view of these limitations, it would be beneficial to have a telephonic type keypad that required only a single stroke to code for alpha-characters (including symbols), and did not require the use of an ancillary tool to make inputs.

SUMMARY OF THE INVENTION

The present invention is a new device and method for the generation of coded address data useful in telephonic communications equipment. More specifically, the present invention is an alphanumeric keypad configured in an array of twelve multi-functional, manually actuated control elements (e.g., push button switch elements). The push button switch elements are multi-functional in that each push button switch element is capable of coding for up to three different input codes upon a single operation of the switch element. Generally, an input code represents an individual character of the alphabet, a typographical symbol or a numerical digit. As used herein a "character" can be any ASCII codable letter, digit, symbol, punctuation, space, etc.

The present invention is useful as a telephone pushbutton keypad entering alpha-character codes, symbol codes, as well as numerical digit codes into a telephonic communications device, such as a POTS or a cellular telephone. The present alphanumeric keypad utilizes triple function push button switch elements for at least eleven of the manually actuated control elements. The twelfth manually actuated control element can be either a double or triple function push button switch element. The twelfth push button switch element is utilized as a mode key to selectively enable the triple function feature of the other eleven switch elements. The multiple functionality of the twelfth switch element is always operable, but the multiple functionality of the other eleven push button switch elements is only enabled upon activation of the mode key feature of the twelfth push button switch element.

When the mode feature of the twelfth switch element is not activated, the other eleven push button switch elements and at least one function of the mode key code for the typical numeric digit or symbol ("*" or "#") of a telephonic keypad. This is the first function of the mode key. Upon activation of mode key, the triple function feature of the other eleven switch elements becomes enabled. If the mode key is a double (two) function push button switch element, the present alphanumeric keypad is capable of directly coding for a second set of 33 alpha-characters and symbols in addition to the first set having the ten digits and the "*" and "#" symbols of the POTS keypad. If the mode key is a triple (three) function push button switch element, a third set of 33 additional alpha-characters and symbols (e.g., uppercase letters) can be made available for coding by the present keypad. To use the present keypad to enter alphanumeric or symbols from one of the three sets of alphanumeric characters and symbols, the mode key is operated to select the corresponding set of characters and symbols.

If it is desired to have even more characters and symbols available, the default or first set of characters can be expanded from the ten digits and the "*" and "#" symbols of the typical POTS keypad to include an additional 22 characters and/or symbols, two each on the eleven push button switch elements. These alternative additional sets of characters and symbols do not require rewiring of the present keypad to accomplish their enablement. Inclusion of optional additional triple function switch elements in the array further increases the repertoire of characters, symbols and digits codable by the present alphanumeric keypad.

A manually operated control element of the present invention is typically a multi-functional, push button type switch element. However, a slide or combination slide and push button switch element also is practicable in the present keypad. Each multi-functional switch element is a single, push button actuated control element which is selectively operable to momentarily establish continuity in one of three different switching configurations. Continuity occurring in any switching configuration is communicated to a processor circuit which detects the continuity configuration and then enters the appropriate alphanumeric (i.e., letter, symbol or digit) code into an associated device or circuit. Each switching configuration is detectable by the processor circuit as an individual alphanumeric character.

The present invention is a telephone equipment compatible alphanumeric keypad for entering discrete alphanumeric data into communications devices, such as cellular telephones and personal digital devices (PDAs). The keypad comprising a housing containing a telephone equipment compatible array of manually actuated switch elements (i.e., push button switch elements). The array has four rows with each row having three push button switch elements per row. Each switch element is selectively operable to provide one of three discrete outcomes. This is accomplishable by the switch element being operable to provide continuity in one of three electrical circuits discernable to an attached processor.

A push button switch element is comprised of a push button assembly and a switch assembly. A push button assembly has an upper surface upon which is carried indicia of the alphanumeric characters the associated switch element can encode. The various push button assemblies of the keypad are labeled with the three alpha characters and one numeral and the "*" and "#" symbols, in the manner typical of prior POTS telephonic keypads push buttons. Additional alpha-characters and symbols can be added to the "1" key or the symbol keys. Optionally, additional push button switch elements can be added to the keypad. In this way, a full alphabet and other useful symbols can be encoded by the present alphanumeric keypad.

The switch assemblies are comprised of a two-way switch assembly having two separate switches or a three-way switch assembly having three separate switches. The switch assemblies comprise single pole/single throw (SPST) or double pole/single throw (DPST) switches, each wired in a manner to provide a triple function switch element as described above. The push button assembly of a typical switch element operatively communicates with two or three switches of the switch assembly. In the case of the two-way switch, the three outcomes are accomplished by the push button assembly contacting one or the other of the two switches, or both switches together. In the case of the three-way switch, the three outcomes are accomplished by the push button assembly contacting one of three individual switches.

A two-way push button assembly includes a combination rocker and push button cover which is manually operable by the user to selectably close either of the two switches individually and both switches together. Closing either of the two switches individually provides continuity in either of the two circuits associated with each switch. Closing both switches together provides continuity in the combination of the two circuits. The combination rocker and push button cover includes an upper surface that is a user interface, the user interface having a configuration selected from the group consisting of: the combination button with bossed ends, the combination button with wedge ends; the combination button with lever ends; the combination button with bossed center; the combination button with center lever; and the combination button with center recess.

The three-way push button assembly includes a push button cover manually operable to selectably close any one of the three switches of the three-way switch assembly. The push button assembly of a three-way switch, also has a push button cover with an upper surface that is a user interface. The user interface can have a configuration selected from the group consisting of: a depressable triple boss cover, a combination rocker and push button cover, a rocker with center button cover, a combination slide and push button, and triple push button covers.

The ergonomics of the configuration of the upper surface of a button cover is to provide positive tactile information to the user of the keypad concerning the left, right and center push button function options. The user can easily discern through touch the aspect of his/her finger on the button cover and manually operate the actuator with confidence and facility. The upper or user interface surface of button covers having ends that are wedge-shaped or have projections from the surface that are tactually discernable are particularly useful in the present invention. Additionally these surface features can serve as levers to facilitate a user's operation of the push button cover. Further, for those button covers that are operable as a center push button, a recess or depression at the center of the surface of the button cover, relative to the ends, can make it easier to operate in that position, as well as to easily discern the left and right operating positions of the button cover.

A processor circuit is in electrical communication with each switch to detect its operation to establish continuity in the switch circuit. The processor circuit also includes a discriminator circuit to detect inappropriate switch operations, for example, when two different keys are operated either simultaneously or too close in time.

DETAILED DESCRIPTION OF THE INVENTION

Referring now to the drawings, the details of preferred embodiments of the present invention are graphically and schematically illustrated. Like elements in the drawings are represented by like numbers, and any similar elements are represented by like numbers with a different lower case letter suffix.

Figure 1:
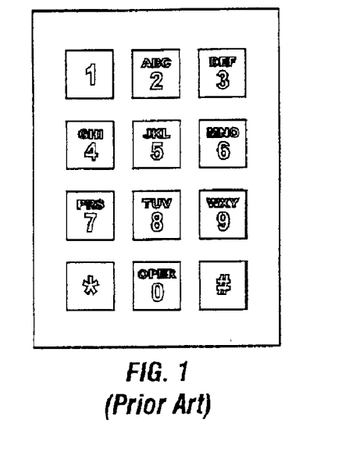
FIG. 1 is a top plan view illustrating the configuration a the typical prior art telephone keypad, showing the typical twelve actuator elements (push buttons) and their labeling.

FIG. 1 is an illustration of a typical prior art POTS keypad. The prior art keypad was capable of coding only for twelve characters: the ten digits and the "*" and "#" symbols. The present invention is an improvement on the prior twelve button keypad arrangement (FIG. 1), in that although it may be similar in appearance, it differs in its capability to code for an expanded character set of three and more times as many characters. Additionally, the present invention can accomplish its coding of any individual character of the expanded character set without the need for repetitive operation of a character key.

Figure 2A:
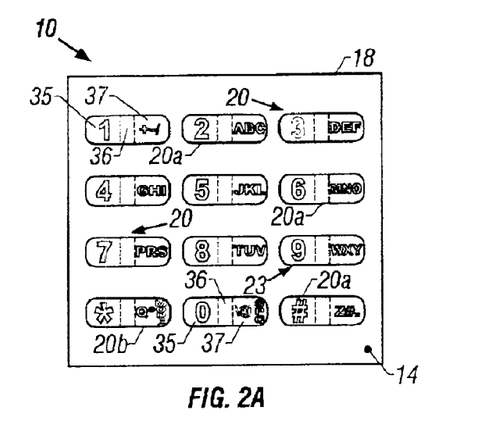
FIG. 2A is a top plan view illustrating an embodiment of the present keypad having a twelve actuator element (key) array and the labeling of the individual keys.

The present invention is a telephonic equipment compatible keypad for entering discrete alphanumeric data into devices such as cell phones, television remote controls and personal digital assistants (PDA's). In a preferred embodiment shown in FIG. 2A, the present keypad 10 is at least in part configured as a typical POTS keypad comprising housing 14 an array 18 of twelve manually operated control elements (multi-functional push button switches) 20. Generally, eleven of these control elements 20 are character keys 20a. A least one control element 20 on the keypad 10 is a mode or shift key 20b. Each key is selectably operable to provide one of three discrete outcomes. In a twelve key array 18, the "*" button (or the "#") button serves as the mode key 20b, and is operated to select an alternative set of character codes on the keys of the keypad to be enterable from each of the other keys 20a. In an expanded array, as shown on the keypad of FIG. 2B, one of the additional keys can serve as the mode key 2b to "shift" operation of the keys between the alternative character sets. Typically, the equipment or device into which the present keypad 10 is incorporated will include a display (not shown) to indicate the condition of the mode key 20b, i.e., which character set is selected, and the last entered character.

Figure 3A:
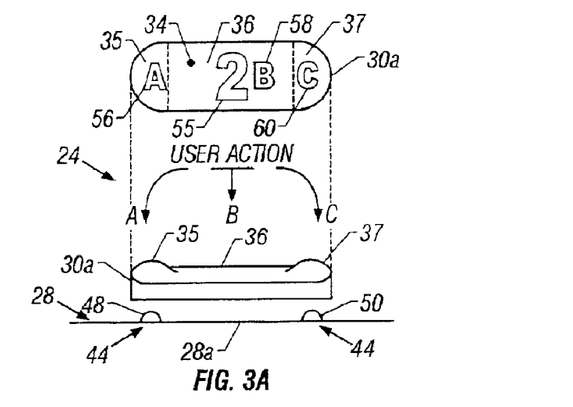
FIGS. 3A to 3E are combined top plan and side elevation views of various alternative embodiments of two-way switches practicable in the present invention.

The manually operated actuator elements or keypad keys 20 comprises a push button assembly 24 (see FIGS. 3A–E and FIGS. 4A–E) and a switch assembly 28 (see FIGS. 5A–D). In a preferred embodiment shown FIGS. 3A–E, the push button assembly 24 for use with a two-way switch assembly 28a comprises a push button cover 30 which is a combination rocker and push button means 30a, having an upper surface 34 that is a user interface upon which the user acts to operate the key 20. The push button assembly 28a is manually operable to selectably close the two switches associated with it individually or both switches together. The upper surface 34 of the push button cover 30 has a left side 35, a center 36 and a right side 37. The user interface surface 34 is configured to provide positive tactile information to the user of the keypad 10 concerning the left 35, the center 36 and the right 37 push button function options. The user can easily discern through touch the aspect of his/her finger on the button cover 30 and manually operate the actuator 20 with confidence and facility. Configurations of the user interface surface 34 that are practicable with a two-way switch assembly 28a in the present keypad 10 include: a combination button cover 30 with bossed ends (FIG. 3A), a combination button cover 30 with wedge ends (FIG. 3B); a combination button cover 30 with lever ends (FIG. 3C); a combination button cover 30 with bossed center; a combination button cover 30 with center lever (FIG. 3D); and a combination button cover 30 with center recess (FIG. 3E).

Figure 3B:
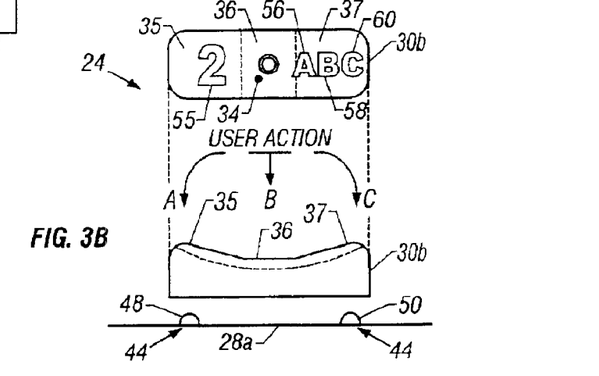
Figure 3C:
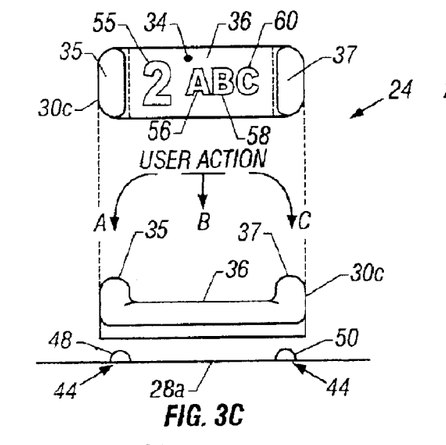
Figure 3D:
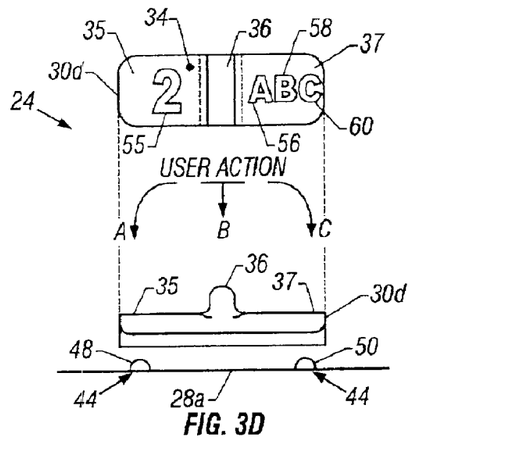
Figure 3E:
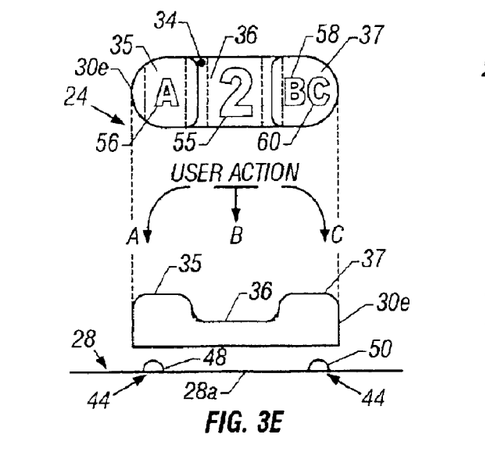
Figure 4A:
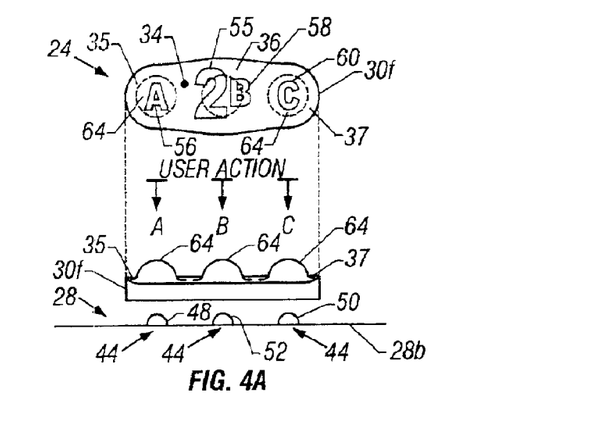
FIGS. 4A to 4E are combined top plan and side elevation views of various alternative embodiments of three-way switches practicable in the present invention.
Figure 4B:
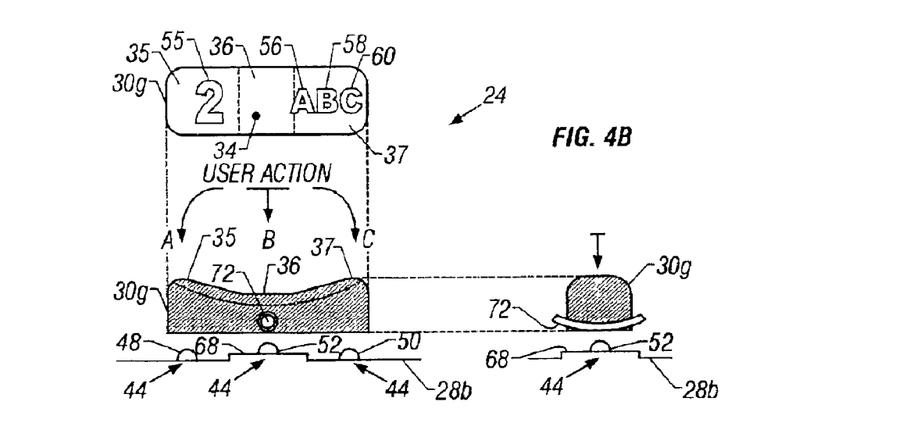
Figure 4C:
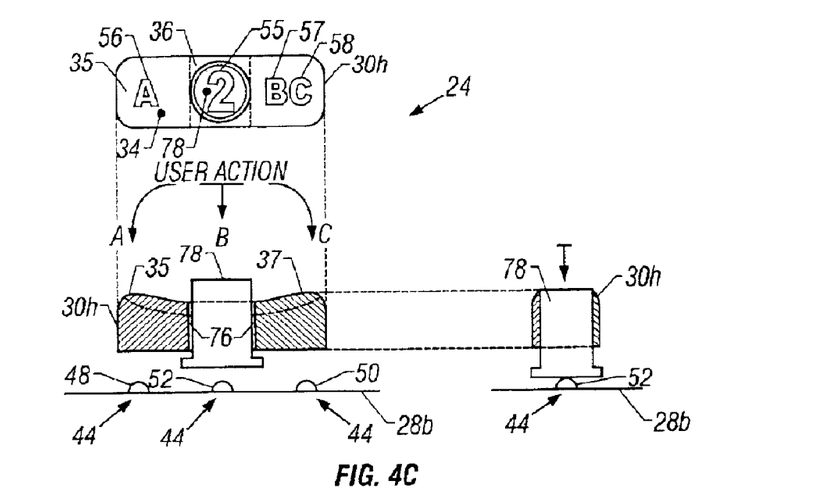
Figure 4D:
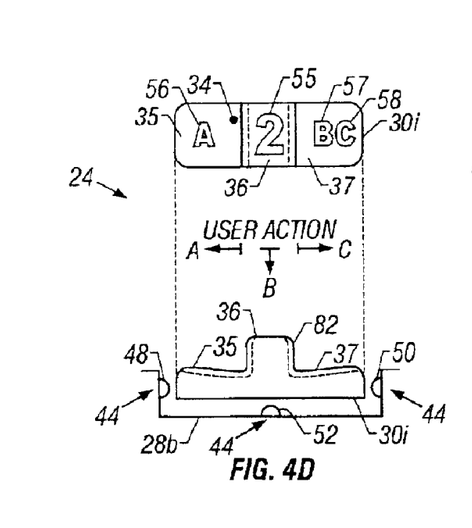
Figure 4E:
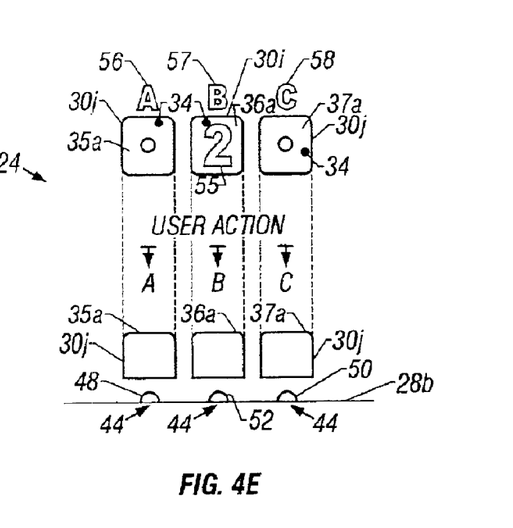
Figure 5A:
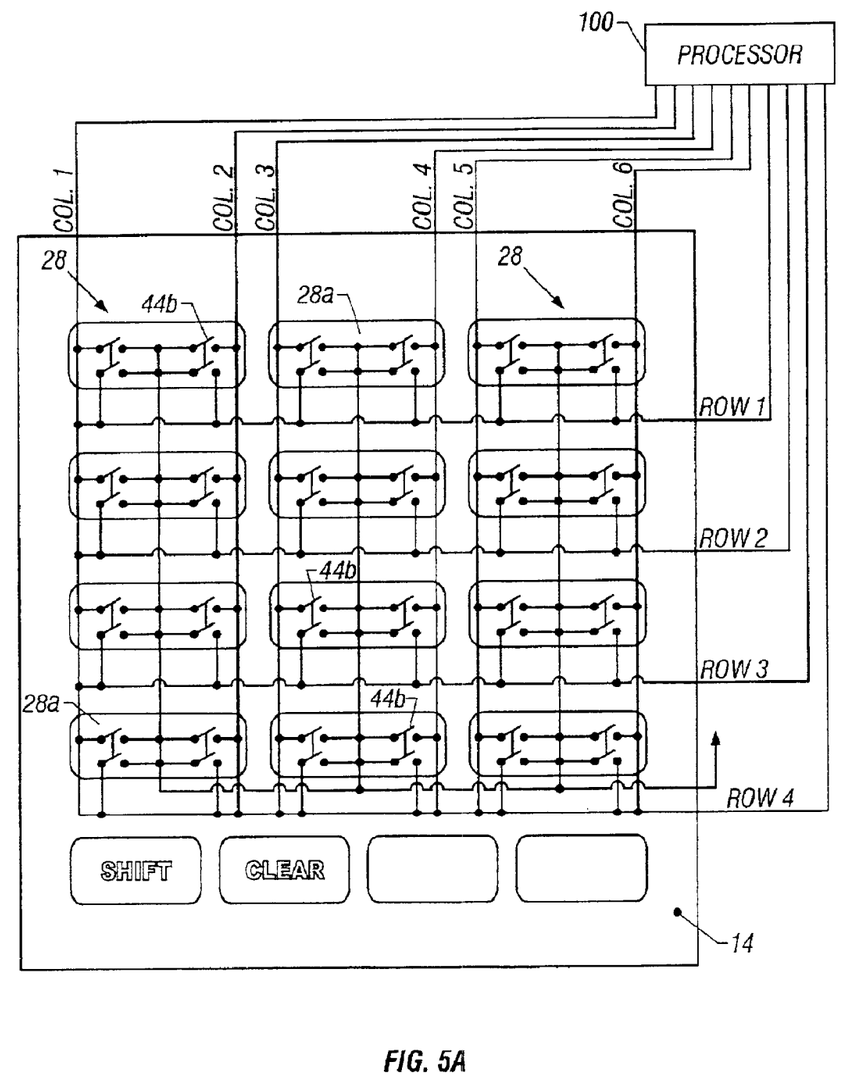
FIG. 5A is a schematic wiring diagrams for a twelve key, two-way switch array of the present invention utilizing DPST switches.
Figure 5B:
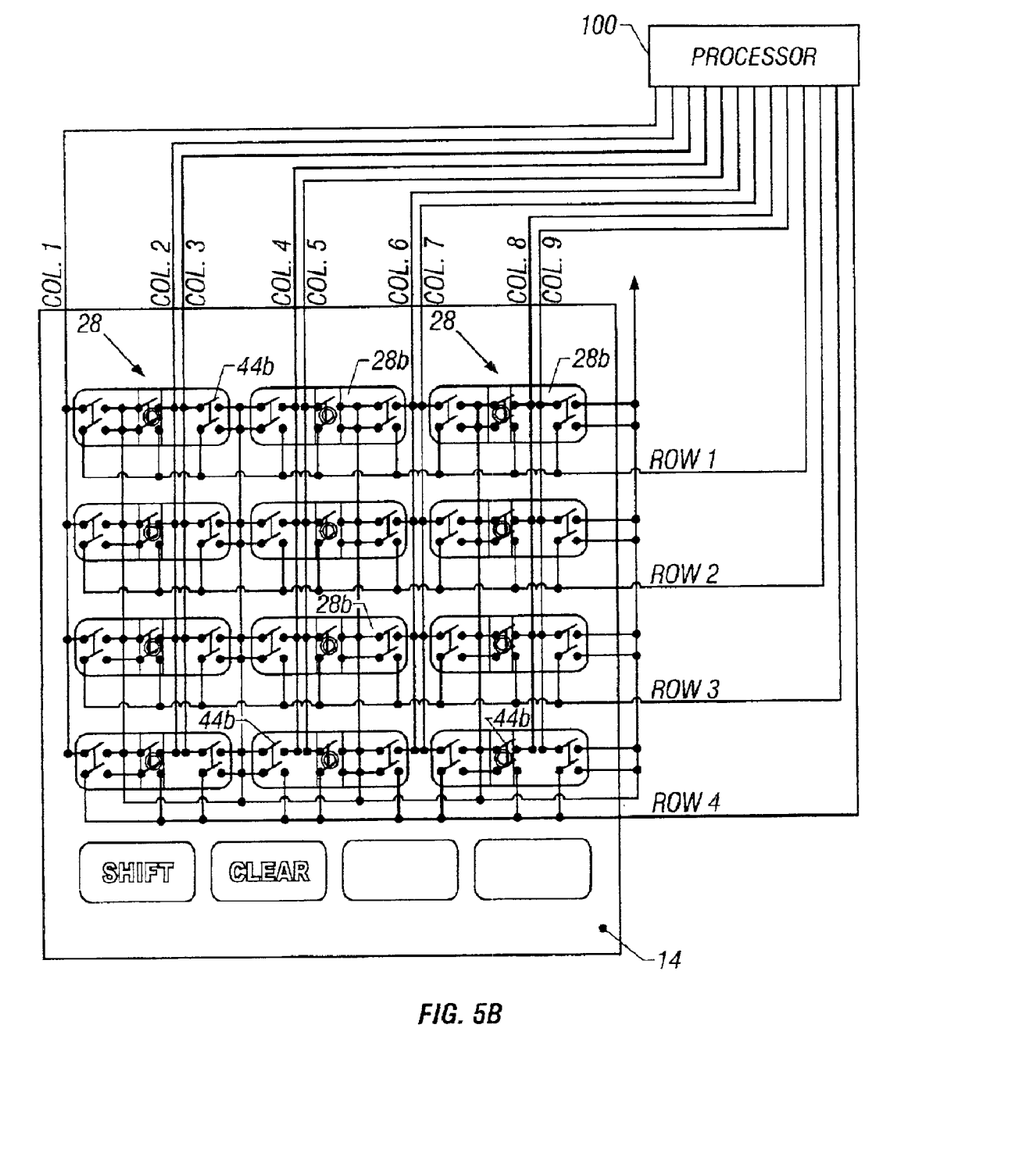
FIG. 5B is a schematic wiring diagram for a twelve key, three-way switch array of the present invention utilizing DPST switches.
Figure 5C:
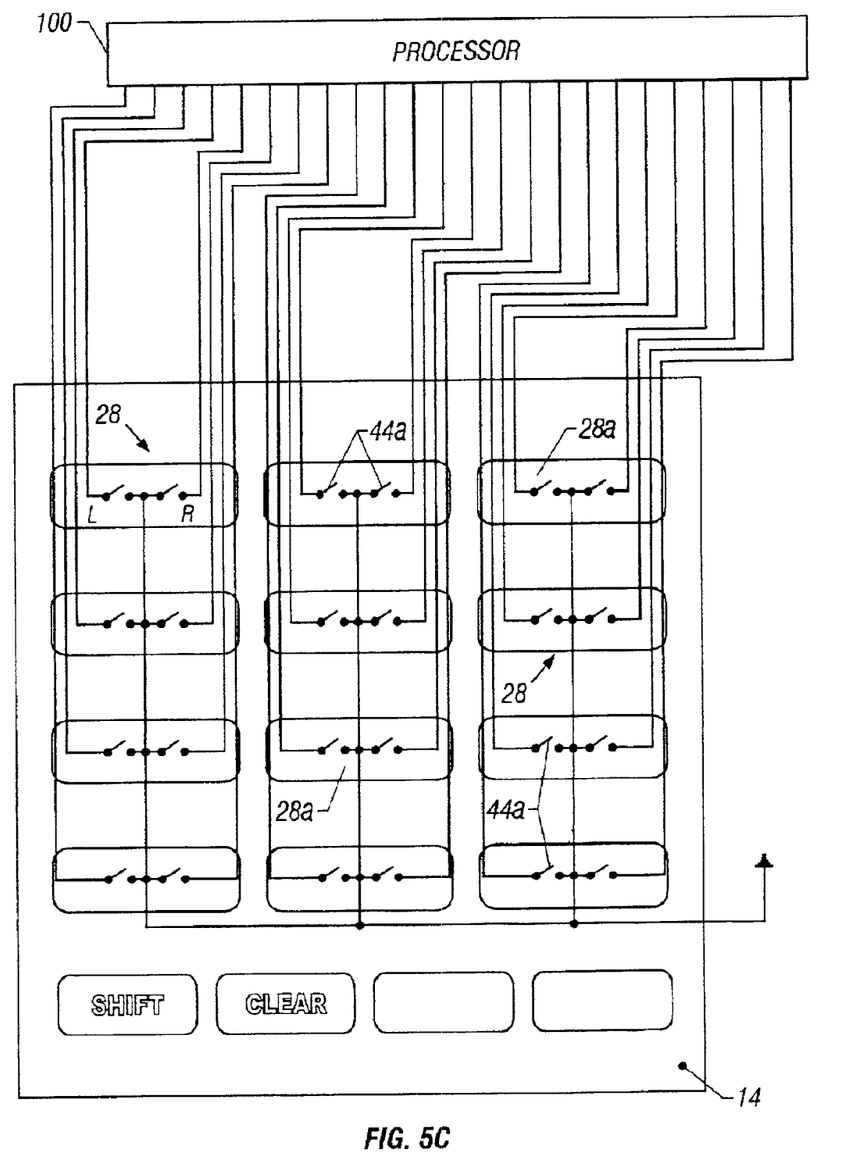
FIG. 5C is a schematic wiring diagram for a twelve key, two-way switch array of the present invention utilizing SPST switches.
Figure 5D:
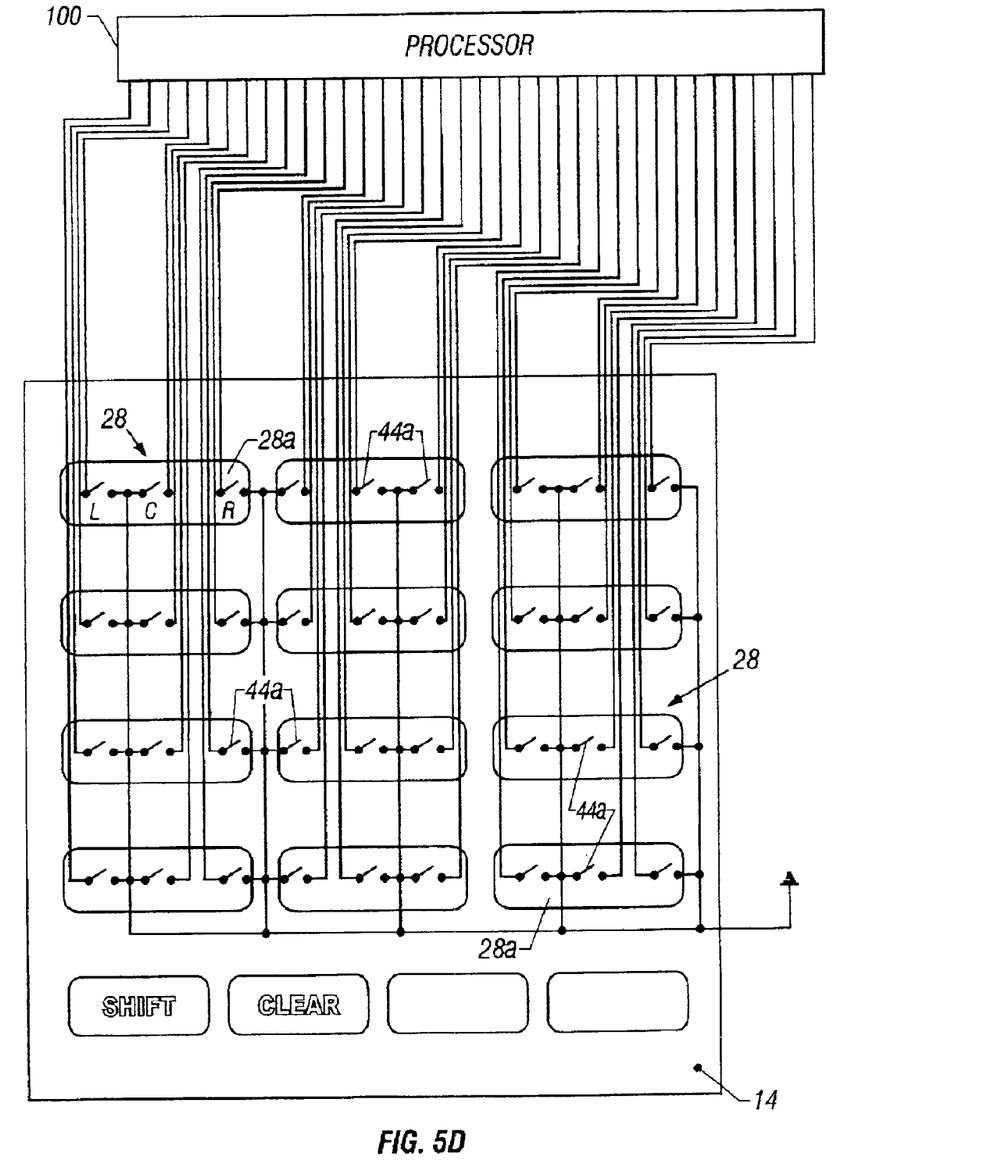
FIG. 5D is a schematic wiring diagram for a twelve key, two-way switch array of the present invention utilizing SPST switches.

In another preferred embodiment shown FIGS. 4A–E, the push button assembly 24 for use with a three-way switch assembly 28b comprises a push button cover 30 which is push button means 30a having an upper surface 34 that is a user interface upon which the user acts to operate the key 20. The upper surface 34 of the push button cover 30 has a left side 35, a center 36 and a right side 37. The user interface surface 34 is configured to provide positive tactile information to the user of the keypad 10 concerning the left 35, the center 36 and the right 37 push button function options, and to allow the user to selectably operate any one of the three associated switches individually. Configurations for the user interface surface 34 that are practicable with a three-way switch assembly 28b in the present keypad 10 include: a depressable triple boss button cover 30 (FIG. 4A), a combination rocker and push button cover 30 (FIG. 4B and see FIGS. 3A–3E), a rocker with center button cover 30 (FIG. 4C), a combination slide and push button cover 30 (FIG. 4D), and triple push button 30 (FIG. 4E).

Switch assemblies 28 and switches 44 are known in the art. For example, Gardner et al. disclose a switch assembly practicable in the present invention by the ordinary skilled artisan. The switch assemblies 28 comprise switches 44 that are single pole, single throw (SPST) 44*a* and/or double pole, single throw (DPST) 44*b* momentary type switches. There are numerous SPST and DPST switches 44*a* & 44*b* known to the ordinary skilled artisan and commercially available. SPST switches 44*a* tend to require more processor inputs than DPST switches 44*b*. See FIGS. 5A–5D. An example of a DPST switch 44*b* practicable in the present invention is the Panasonic Type EVQPW. Where the switch assembly 28 utilizes a two-way switch assembly 28*a*, in that the switch assembly 28*a* comprises two switches 44 (see FIGS. 5A and 5C), the push button assembly 24 is manually operable to selectably close either switch individually and both switches together. Where the switch assembly 28 utilizes a three-way switch assembly 28*b*, in that the switch assembly 28*b* comprises three switches 44 (see FIGS. 5B and 5D), the push button assembly 24 is manually operable to selectably close any one of the switches 44 individually. In the case of either switch assembly 28*a* & 28*b*, a character key 20*a* is operable upon a single actuation to obtain one of three discrete outcomes, i.e., to code for one of three discrete characters. In a preferred embodiment, this is accomplished by the switch assembly 28 comprising circuitry having three detectably different electric circuit continuity configurations.

A processor circuit 100 is in electrical communication with each switch 44 of every manually operated actuator or key 20. The processor circuit 100 is operable to discern the continuity configuration of the switch assemblies 28 of the keypad 10. When a key 20 is selectively actuated, the processor 100 detects the establishment of continuity in the switch 44 associated with the key 20 and the character coded for. The processor circuit 100 further comprises a discriminator circuit (not shown) to detect an inappropriate operation of the switches 44. Processors 100 and interconnect wiring for communicating between processors 100 and keypad switches generally are known in the art. Interconnect wiring means applicable in the present invention are known to and selectable by the ordinary skilled artisan for practice in the present invention. Examples of wiring strategies include disclosure by Ala-Lehtimaki et al., U.S. Pat. No. 5,877,709, and Gardner et al., U.S. Pat. No. 5,900,829.

Figure 2B:
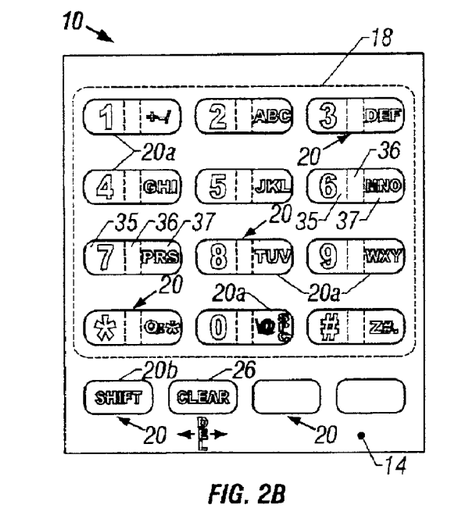
FIG. 2B is a top plan view illustrating another embodiment of the present keypad, showing a twelve actuator element (key) array combined with an expanded set of keys, and the labeling of the individual keys.

Each of the keys 20 utilizes two or three internal switches 44, operating in conjunction with the mode or shift key 24*b*, to determine which of its listed characters or codes is input into a device associated with the keypad 10. As shown in FIG. 2B, an optional "clear" key 26 can be provided for "erasing" mistakes or performing like functions. An example of how this can be accomplished is to have three functions of the key be: cursor left; delete; and cursor right, as shown in FIG. 2B.

Figure 6A:
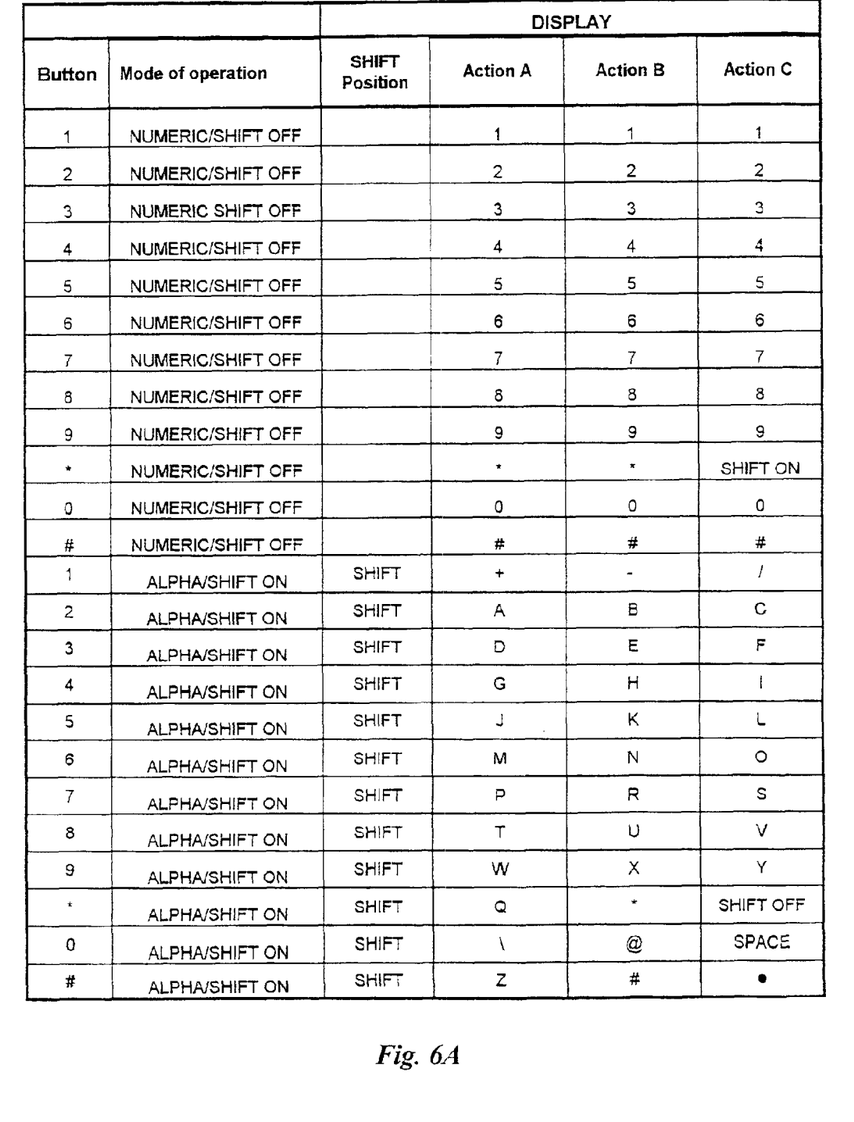
FIG. 6A is a table showing shift position, button and action versus the character encoded for the keypad of FIG. 2A having two separate character sets, one of which is the twelve character set of a typical POTS keypad.
Figure 6B:
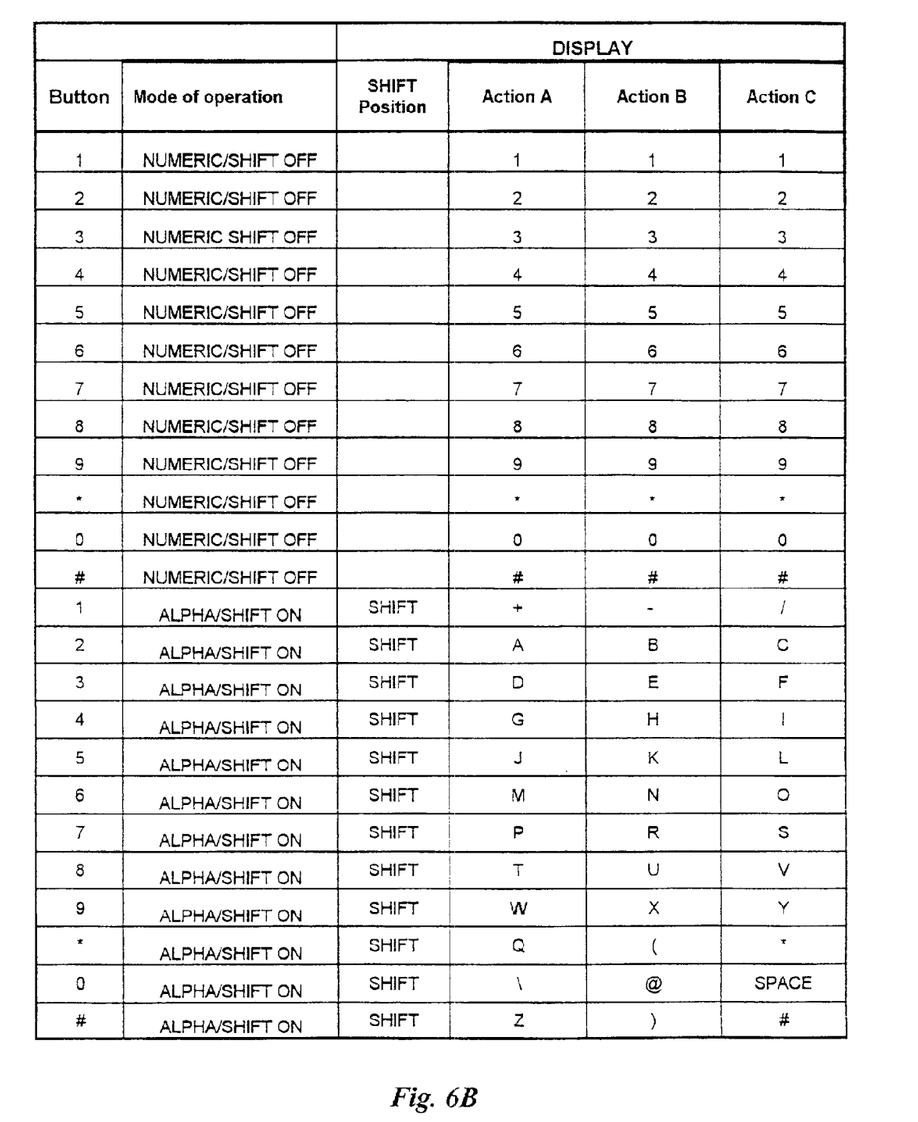
FIG. 6B is a table showing shift position, button and action versus the character encoded for the keypad of FIG. 2B having two separate character sets, one of which is the twelve character set of a typical POTS keypad.
Figure 7:
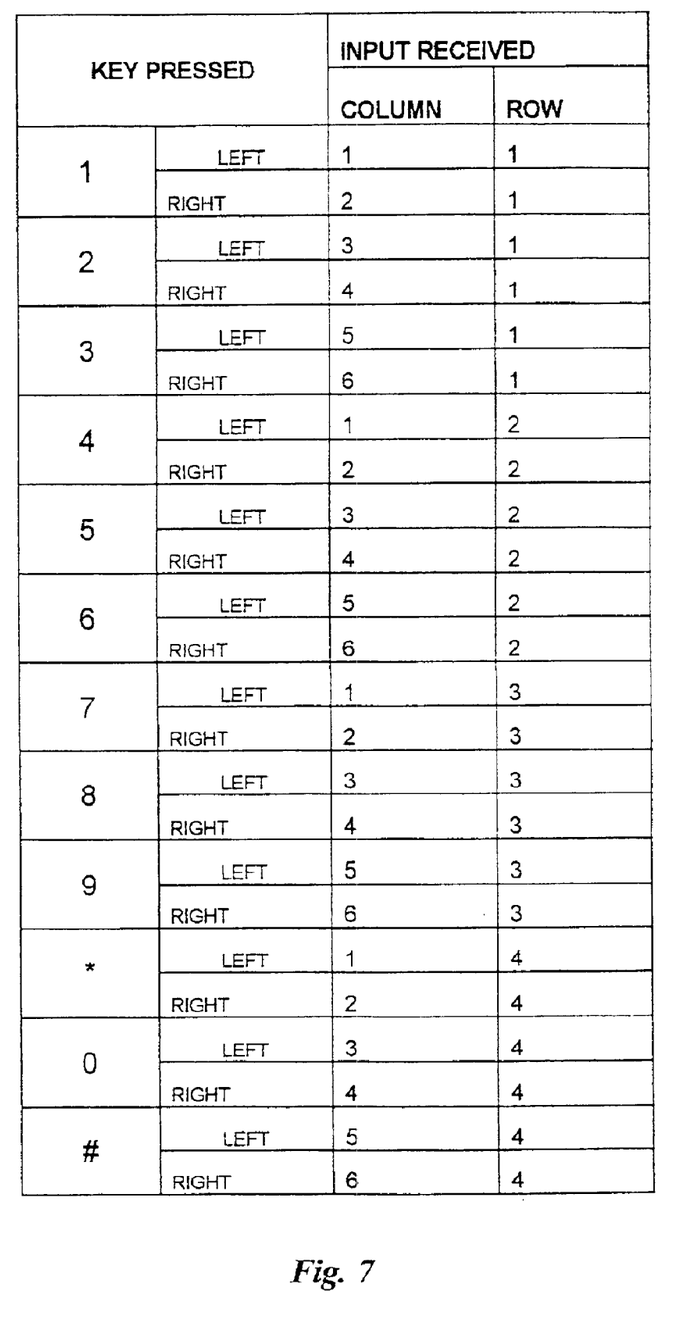
FIG. 7 is a table showing inputs codes received upon activation of the various push button functions of the two-way switch assembly array shown in FIG. 5A.
Figure 8:
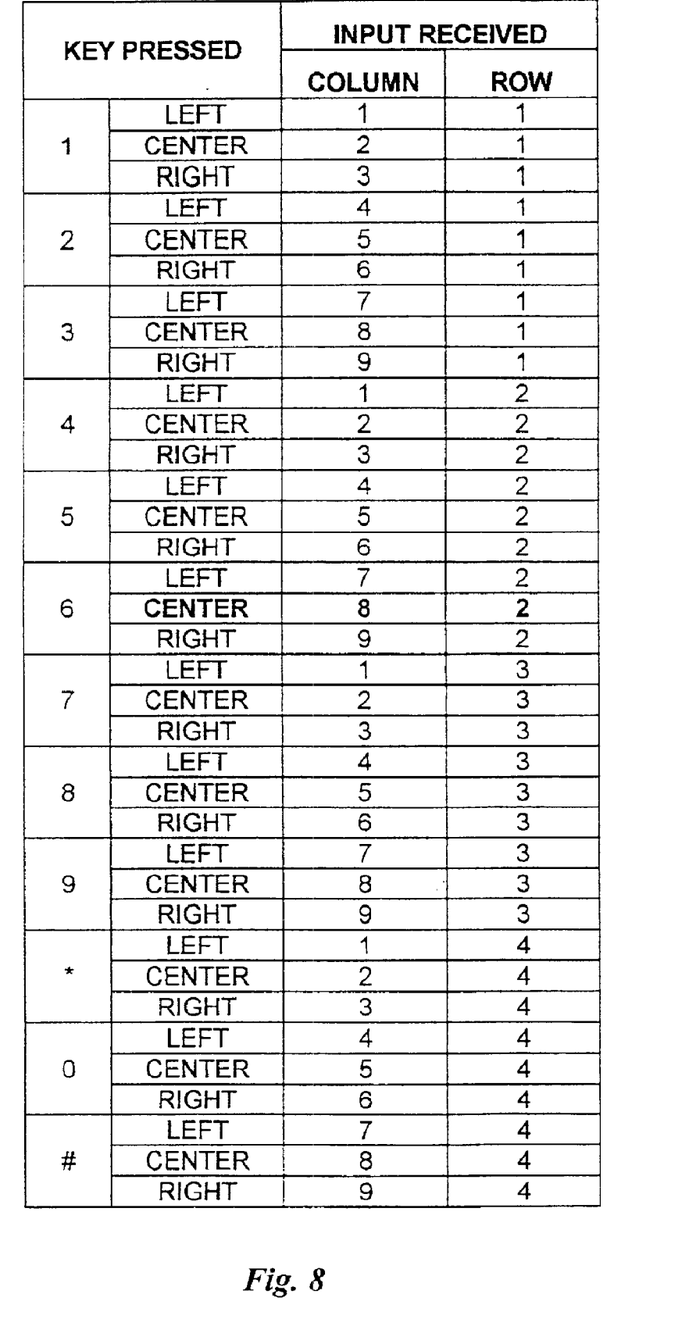
FIG. 8 is a table showing inputs codes received upon activation of the various push button functions of the three-way switch assembly array shown in FIG. 5B.

In the preferred embodiment, the default mode of the keypad 10 (e.g., when the associated device is turned on) is the "numeric mode" of the typical POTS keypad. In this case, the key characters of the typical POTS keypad are the default characters 55 of the present keypad 10. The user can select or shift between the alternative character sets using the shift key. In a preferred embodiment, when in the numeric mode, the numeric character is generated regardless of how each of the keys 20 of the twelve key array 18 are pressed. In an alternative character set mode, pushing the left side of each character key 20*a* will produce the first character on the button, pushing the center of the key 20*a* will produce the second character on the button and pushing the right side of the key 20*a* will produce the third character. FIGS. 6–8 are tables that map shift/mode key 20*b* position and character key 20*a* actuation against the resulting character coded for.

Numerous button cover styles are possible and shown for illustration. The button covers 30 are generally disposed above and in mechanical communication with each of two or three switches 44 of the associated switch assembly 28. See FIGS. 3A to 3E for two-way switch button covers 30. See FIGS. 4A to 4E for three-way switch button covers 30. A description of each button cover 30 and its operation is included below.

Figure 9:
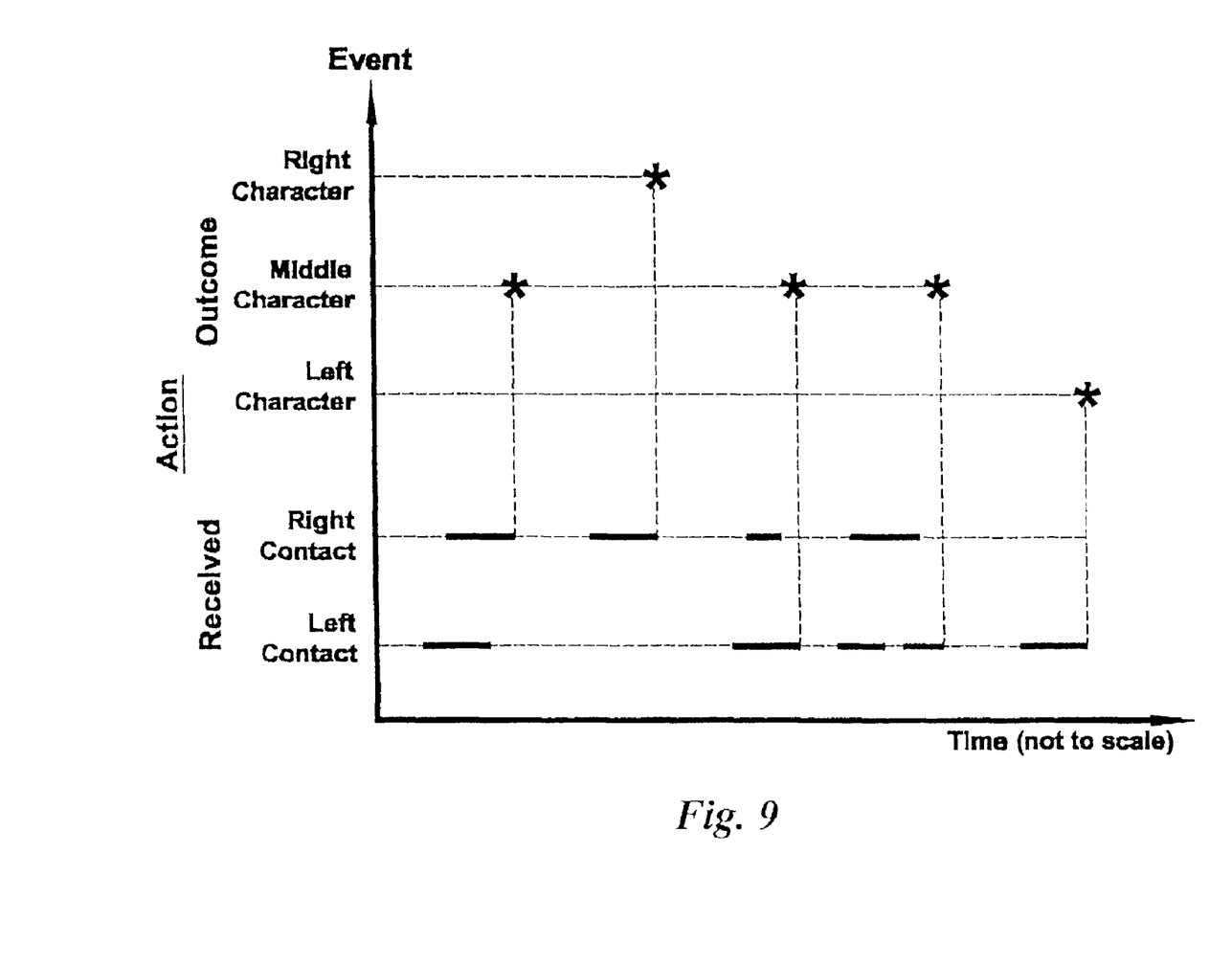
FIG. 9 is a graph of an exemplary Time versus Action relationship for activation of a keys on a keypad array having two-way switch assemblies.

In use, in two-way switch assemblies 28*a*, the operational scheme allows for three possible code outcomes. The code outcome from an activation of the keypad 10 ultimately is interpreted by the processor 100. An example of an operational scheme follows. In the default or "numeric mode," when either of the two switches 44 makes and is subsequently released, the digit or symbol on the button cover 30 is registered. If both switches 44 make together, then the digit or symbol still is registered, but just once. With the mode or shift key 20*b* actuated ("alpha mode"), if the left switch 48 is made and then released, the left character 56 is registered. If the right switch 50 is made and then released, the right character 60 is registered. If a left or right switch 48, 50 registers and the second switch registers before the first releases, the center or middle character 58 registers when both switches have been released. An example is the following sequence: left switch 48 made, right switch 50 made, left switch 48 released, right switch 50 released, outcome is the middle character 58 registers. If the right switch 50 is made and then released, the outcome is right character 60 is coded. If the left switch 48 is made, right switch 50 is made, then the right switch 50 is released, then the left switch 48 is released, the outcome is the center character 58 is coded. If the left switch 48 is made, then the right switch 50 is made, then the left switch 48 released, the left switch 48 is made again, then the right switch 50 is released, then the left switch 48 is released, the outcome is middle character 58 is coded. If the left switch is made and then released, the outcome is the left character 56. An exemplary time versus action plot of this sequence is shown in FIG. 9.

All two-way switch assembly 28*a* buttons covers 30 are made from fairly rigid material. Three-way switch assembly 28*b* button covers 30 additionally can be made of a soft, pliable material as described below. A first two-way switch button cover 30*a* is shown in FIG. 3A. It is ovoid shaped and its upper surface 34 has left and right sides 35 & 37 each with a raised dimple and separated by a long flat spot over the center 36 portion of its surface 34. Pressing down on either side 35 & 37 of a button cover 30*a* causes the button cover 30*a* to mechanically communicate with and make (close) the switch 44 below that side. Pressing down the center 36 of the button cover 30*a* similarly makes both switches 48 & 50.

A second two-way switch button cover 30*b* is shown in FIG. 3B. It is rectangular shaped from a top view, and its upper surface 34 has left and right sides 35 & 37 each raised at the ends of the button cover 30*b* and tapering at an angle toward a section over the center 36 portion of its surface 34. Pressing down on either of the sides 35 & 37 of the button cover 30*b* closes the switch 44 below that side. Pressing down the center 36 of the button cover 30*b* closes (makes) both switches 48 & 50.

A third two-way switch button cover 30*c* is shown in FIG. 3C. It is rectangular shaped and its upper surface 34 has left and right sides 35 & 37 each with a raised ridge proximal the distal ends of the button cover 30*c*, which are separated by a long flat spot over the center 36 portion of its surface 34. Pressing down on either side 35 & 37 of the button cover 30*c* makes the switch 44 below that side. Pressing down the center 36 of the button cover 30*c* makes both switches 48 & 50.

A fourth two-way switch button cover 30*d* is shown in FIG. 3D. It is rectangular shaped and its upper surface 34 has left and right sides 35 & 37 which are flat and has a sharply raised ridge at the center 36 of its surface 34. Pressing down on either side 35 & 37 of the button cover 30*d* makes the switch 44 below that side. Pressing down the center 36 of the button cover 30*d* makes both switches 48 & 50.

A fifth two-way switch button cover 30*e* is shown in FIG. 3E. It is ovoid shaped and its upper surface 34 has left and right sides 35 & 37 each with a large raised boss and separated by a deep recess at the center 36 portion of its surface 34. Pressing down on either side 35 & 37 of the button cover 30*e* makes the switch 44 below that side. Pressing down the center 36 of the button cover 30*e* makes both switches 48 & 50.

The three-way switch assembly 28*b* button covers 30 allow for simple entry of each character, either left 56, right 60 or center 58. In an exemplary operational scheme, in the numeric mode, when any of the three switches 44 makes and is subsequently released, the digit or symbol on the button cover 30 is coded. In alpha mode, the character corresponding to the switch 44 which is made and released is coded. If multiple switches 44 make before the first switch 44 pressed is released, only the character corresponding to the first made switch 44 is coded. An example would be in the sequence: left switch 48 is made, then the center switch 52 is made, then the left switch 48 is released, then the center switch 52 is released, the left character 56 is coded or registered. This allows for clumsy users to get the more likely or first result.

A first three-way switch assembly 28*b* button cover 30*f* is shown in FIG. 4A. It is ovoid shaped and the left 35, right 37 and center 36 its surface 34 each has a raised dimple 64 disposed on it. The button cover 30*f* is comprised of an easily flexible material allowing the dimples 64 to be depressable to make (close) the switch 44 below that dimple 64. Pressing the left 35, right 37 or center 36 section of the button cover 30*f* mechanically communicates with and closes the left 48, right 50 and center 52 switches respectively.

A second three-way switch button cover 30 is shown in FIG. 4B. It is rectangular shaped from a top view, and has its left and right sides 35 & 37 each raised at the ends of the button cover 30*g* and tapering at an angle toward the center 36 portion of its surface 34. This provides a button cover 30*g* having raised angles at its ends separated by a flat center. In communicating with the switch assembly 28*b*, the button cover 30*g* (and other relatively rigid push button covers 30 for three-way switch 28*b*), must be able to be pushed straight down to make or close the center switch 52 without closing the left or right switches 48 & 50. This may be accomplished by having the center switch 52 in closer proximity than the left and right switches 48 & 50 to the push button assembly 24, so that the center switch is preferentially engaged by the button cover 30. In FIG. 4B, this is accomplished by having the center switch on a platform 68. Alternatively, the platform 68 could be disposed on the bottom of the push button assembly 24 over the center switch 52. In a preferred embodiment, a flexible pivot 72 passes through the center of the short side of the button cover 30*g*. The button cover 30*g* pivots around the flexible pivot 72 when either side 35 & 37 of the button cover 30*g* is pressed. Pressing either side 35 & 37 of the button cover 30*g* rotates the button cover 30*g* about the pivot 72, to mechanically engage and make the switch 44 below that side. Pressing the center 36 of the button cover 30*g* causes the flexible pivot 72 to stretch, allowing the button cover 30*g* to mechanically engage and make the center switch 52. The center switch 52 shown in FIG. 4B is slightly raised by the platform 68, to facilitate having just the center switch 52 make when selected by a user. Alternatively, the platform 68, or a similarly functional feature, could be provided on the bottom of the button cover 30*g*, as opposed to under the center switch 52. This would allow all of the switch assemblies 28 to be on the same level, and facilitate the manufacture of this component of the present keypad 10.

A third three-way switch button cover 30*h* is shown in FIG. 4C. It is rectangular shaped and has a passage 76 through the center 36 of its surface 34. A separate button post 78, which moves independent of the button cover 30*h*, is received in the passage 76. Pressing either side 35 & 37 of the button cover 30*h* makes the switch 44 below the respective side. Pressing the button post 78 in the center 36 of the button cover 30*h* makes the center switch 52.

A fourth three-way switch button cover 30*i* is shown in FIG. 4D. It is rectangular shaped and has a raised center boss 82 at the center 36 of its user interface surface 34. The button cover 30*i* is a combination push and sliding button cover for mechanically engaging and closing the switches 44 of the switch assembly 28*b*. Sliding the button cover 30*i* to the left makes the left switch 48, sliding it to the right makes the right switch 50, and pressing the button cover 30*i* straight down makes the center switch 52.

A fifth three-way switch button cover 30 is actually three separate button cover 30*j* which sit above three separate switches 44. Pressing straight down on any button cover 30*j* makes the switch 44 below that button cover 30. One button cover 30*i* serves as the left user interface surface 35*a*, and is in mechanical communication with the left switch 48, for closing that switch 48 when pressed. In a similar manner, the other two button covers 30*i* serve as the center and right interface surfaces 36 & 37, and are in communication with the center and right switches 52 & 50 respectively, for closing the respective switches 52 & 50 when pressed.

While the above description contains many specifics, these should not be construed as limitations on the scope of the invention, but rather as exemplifications of one or another preferred embodiment thereof. Many other variations are possible, which would be obvious to one skilled in the art. Accordingly, the scope of the invention should be determined by the scope of the appended claims and their equivalents, and not just by the embodiments.

What is claimed is:

1. A telephonic equipment compatible keypad for entering discrete alphanumeric data, the keypad comprising:

a telephone set compatible array of manually operated actuators; the array having four rows of three manually operated actuators per each row; each manually operated actuator including a push button assembly and a switch assemby, with the switch assembly consisting of two switches and the push button assembly being manually operable to selectably close either switch individually and both swtiches together; and a processor circuit having an input in electrical communication with each of the two switches of each switch assembly, the processor circuit operable to discern continuity in an electrical circuit of the switch assembly of each of the manually operable actuators, and to output an appropriate outcome of three possible outcomes for each actuator upon a manual operation of the push button assembly.

2. The telephonic equipment compatible keypad of claim 1, wherein the processor circuit further comprises a discriminator circuit to detect an inappropriate switch operation.

3. The telephonic equipment compatible keypad of claim 1, wherein the manually operated actuator, further comprising the push button assembly including a combination rocker and push button means manually operable to selectably close either switch individually and both switches together.

4. The push button assembly of claim 3, wherein the combination rocker and push button means includes an upper surface that is a user interface, the user interface having a configuration selected from the group consisting of: the combination button with bossed ends, the combination button with wedge ends; the combination button with lever ends; the combination button with bossed center; the combination button with center lever; and the combination button with center recess.

5. The telephonic equipment compatible keypad of claim 1, wherein the push button assembly includes an upper surface that is a user interface, the user interface having a configuration selected from the group consisting of: a depressable triple boss cover, a combination rocker and push button, a rocker with center button, and a combination slide and push button.

6. The manually operated activator of claim 1, wherein the switch assembly further comprises switches that are single pole, single throw momentary switches.

7. The manually operated activator of claim 1, wherein the switch assembly further comprises switches that are double pole, single throw momentary switches.

8. The telephonic equipment compatible keypad of claim 1, wherein at least one of the manually operated actuators in the array is operable as a mode key.

* * * * *